(12) United States Patent
Huntley et al.

(10) Patent No.: US 6,177,902 B1
(45) Date of Patent: Jan. 23, 2001

(54) MULTI-FUNCTION RADIO FREQUENCY SIGNAL WARNING SYSTEM

(75) Inventors: William P. Huntley, Old Lyme, CT (US); David J. Swanick, Wakefield; Kichul Cho, North Kingstown, both of RI (US); John D. Borla, Newington, CT (US)

(73) Assignee: The United States of Americas as represented by the Secretary of the Navy, Washington, DC (US)

( * ) Notice: Under 35 U.S.C. 154(b), the term of this patent shall be extended for 0 days.

(21) Appl. No.: 09/349,358

(22) Filed: Jul. 1, 1999

(51) Int. Cl.$^7$ ........................................................ G01S 7/40
(52) U.S. Cl. ................................ 342/20; 342/13; 342/195
(58) Field of Search ............................... 342/20, 13, 195

(56) References Cited

U.S. PATENT DOCUMENTS 5,010,341 * 4/1991 Huntley et al. ...................... 342/342

* cited by examiner

Primary Examiner—Daniel T. Pihulic
(74) Attorney, Agent, or Firm—Michael J. McGowan; Robert W. Gauthier; Prithvi C. Lall

(57) ABSTRACT

A multi-function radio frequency (RF) signal warning system detects different types of RF signals, such as radar signals, provided in various RF bands and provides an indication of the type of radar signal and the RF band. The system detects pulsed radar signals having different pulse repetition frequency (PRF) ranges as well as high duty cycle radar signals and continuous wave radar signals. The system includes a receiver processor that detects the radar signals, video amplifies the radar signals with baseline correction, and processes the radar signals to determine the type of radar signal, e.g., the RF band and PRF range. The receiver processor generates audio and visual control signals and transmits the control signals to one or more remote units. The remote units receive the audio control signals and generate an audible alarm. The remote units receive the visual control signals and illuminate one or more visual indicators, such as LEDs, that indicate the RF band of the radar signal and the PRF range of the radar signal. The remote units can also select one or more bands in which the audio alarm is enabled or disabled. One of the remote units further controls testing and calibration functions in the multi-function RF signal warning system.

25 Claims, 15 Drawing Sheets

MULTI-FUNCTION RADIO FREQUENCY SIGNAL WARNING SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field Of The Invention

The present invention relates to radio frequency signal warning systems and more particularly, to a multi-function radar early warning system that provides an indication and warning of threats based on current and projected future radar systems.

(2) Description Of The Prior Art

Radar is commonly used to detect and locate objects or targets by radiating electromagnetic energy and using the echo or reflection of the electromagnetic energy from the object or target. In general, a typical radar system transmits one or more radio frequency signals to be reflected from objects in the environment. The radar system then receives and analyzes the reflected signals to determine the location or distance to the objects.

Different types of radar systems have used different types of radio frequency signals having a number of different frequency ranges or bands. For example, in a pulsed radar system, the transmitter transmits radio frequency signal pulses that are reflected from objects and then received to determine the distance to the object and the location of the object. In a continuous wave type radar system, a continuous radio frequency signal is transmitted. When the continuous wave is reflected from a moving object, the frequency of the wave changes, thereby providing an indication of moving objects in the environment.

Early warning radar (EWR) systems are commonly used by the military to detect and provide a warning of radar signals and possible threats posed by the vessels transmitting the radar signals. For example, underwater vessels, such as submarines, include periscope antennas that receive various types of radar signals on one or more channels.

Some problems encountered with existing EWR systems include the inability to detect a wide range of different types of radar signals. The existing EWR systems also do not provide an adequate indication of the type of radar signal that was detected.

SUMMARY OF THE INVENTION

One object of the present invention is to provide a multi-function radio frequency signal warning system that provides an indication and warning of threats based on current and projected future radar systems using audible and visual indications of a number of different types of radar signals.

The present invention features a radio frequency (RF) signal warning system that receives one or more RF signals in one or more RF bands. The RF signals may include at least one pulsed RF signal having a pulse repetition frequency (PRF). The RF signals are amplified and conditioned to produce one or more amplified and conditioned RF signals. The amplified and conditioned RF signals are envelope detected to produce corresponding envelope detected RF signals. The corresponding envelope detected RF signals are video amplified to produce corresponding video bandwidth signals having the same pulse repetition frequency (PRF) as the corresponding pulsed RF signals. The video bandwidth signals are processed to determine the PRF range of the pulsed RF signal and to generate and transmit audio and visual control signals to one or more remote units that provide audible alarms and a visual indication of the RF band and the PRF range of the detected RF signals. The RF signal warning system also preferably receives, detects and digitally processes continuous wave (CW) RF signals.

In the preferred embodiment, the RF signal warning system combines the amplified and conditioned RF signals to generate a high amplitude RF signal that is detected and processed with the RF signals. If the high amplitude RF signal exceeds a predetermined high amplitude threshold setting, the system provides a high amplitude audible alarm and a visual indication of the high amplitude signal.

The preferred embodiment of the present invention features a receiver processor used in the RF signal warning system and having a plurality of channel inputs for receiving a plurality of amplified and conditioned RF signals in different RF bands. The receiver processor includes a plurality of RF detectors for envelope detecting each of the amplified and conditioned RF signals to produce the envelope detected RF signals. A plurality of video amplifiers and baseline correction circuits are coupled to the respective RF detectors for video amplifying and baseline correcting each of the envelope detected RF signals to produce the video bandwidth signals. The video bandwidth signals corresponding to pulsed RF signals have the same PRF as the corresponding pulsed RF signals. A processor is coupled to each of the video amplifiers and baseline correction circuits for processing the corresponding video bandwidth signal to determine the RF bands and the PRF range of the pulsed RF signals. In response to determining the RF bands and PRF range of the pulsed RF signals, the processor generates and transmits the audio and visual control signals.

The preferred embodiment of the processor includes a plurality of PRF detectors for receiving the video bandwidth signals and detecting the PRF range of the pulsed RF signals and a microprocessor, coupled to the PRF detectors, for receiving PRF information from the PRF detectors and for generating the audio and video control signals based upon the PRF information. At least one serial transceiver is coupled to the microprocessor for transmitting and receiving control and activity signals to the remote unit.

A plurality of video threshold circuits are preferably coupled to the respective video amplifiers and baseline correction circuits for comparing the video bandwidth signals to a predetermined threshold amplitude and for rejecting pulses in the video bandwidth signals lower than the predetermined threshold amplitude. A plurality of pulse stretching circuits are coupled to the respective video threshold circuits for stretching pulses of the video bandwidth signals.

The receiver processor also preferably includes a plurality of continuous wave signal amplifiers coupled to respective RF detectors for amplifying continuous wave RF signals. An analog-to-digital converter is coupled to the continuous wave signal amplifiers for digitizing the continuous wave RF signals to be processed by the microprocessor.

The present invention also features remote units including an audio control signal receiver for receiving audio control signals and a speaker for generating audible alarms corresponding to the RF signals. Each of the remote units further include a serial transceiver for receiving visual control signals from the receiver processor and a microprocessor for processing the visual control signals to determine characteristics of the RF signals detected by said system and for generating indicator control signals. A plurality of RF signal indicators are responsive to the indicator control signals for providing visual indication of the characteristics of the detected RF signals.

The RF signal indicators preferably include a set of activity indicators for indicating RF signal activity in at least one RF band. RF signal activity includes an indication of the PRF range of the pulsed RF signals in the RF bands that are above the audio frequency range. RF signal activity can also include an indication of continuous wave (CW) RF signals. The remote units also preferably include one or more band selection switches for enabling and disabling audible alarms in selected RF bands and an audio disable switch for disabling the high amplitude audible alarm.

One embodiment of the remote unit can include an analog/digital audio selector for selecting whether the audible alarm for signals with PRF in the audio frequency range follows the RF signal amplitude (analog) or is a fixed amplitude level as long as the signal threshold is broken (digital). One embodiment of the remote unit can also include a calibration offset switch for manually offsetting the threshold amplitude set when in the auto calibration mode.

BRIEF DESCRIPTION OF THE DRAWINGS

These and other features and advantages of the present invention will be better understood in view of the following description of the invention taken together with the drawings wherein corresponding reference characters indicate corresponding parts throughout the several views of the drawings and wherein.

DESCRIPTION OF THE PREFERRED EMBODIMENT

Figure 1:
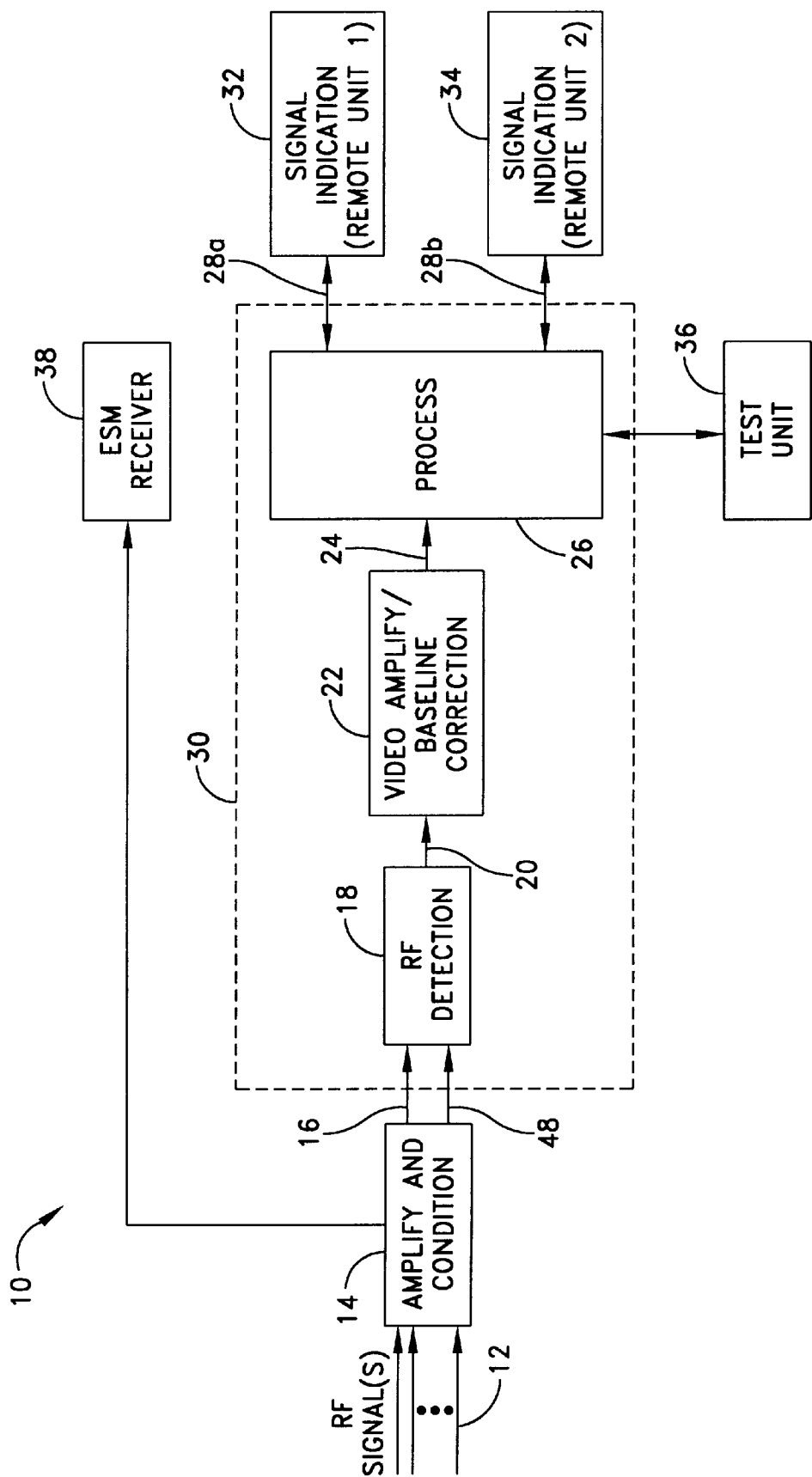
FIG. 1 is a schematic block diagram of a multi-function radio frequency signal warning system, according to the present invention.

A multi-function radar warning system 10, FIG. 1, according to the present invention, receives and detects radar signals in one or more radio frequency (RF) bands and provides a real time audible alarm and visual indication of radar signals in each of the RF bands. The radar signals in each of the RF bands include pulsed radar signals having a series of radio frequency bursts or pulses transmitted at a pulse repetition frequency (PRF) as well as continuous wave (CW) radar signals. One use for the multi-function radar warning system 10 is on a submarine or other military vessel to provide an indication and warning of threats based on current and projected future radar systems. The present invention contemplates using the multi-function radar warning system with other types of radio frequency signals in other applications.

In general, the multi-function radar warning 10 system operates by receiving radar or RF signals 12 within one or more RF bands. The RF signals 12 are amplified and conditioned at amplification module 14 and the amplified and conditioned RF signals 16 are envelope detected at detection module 18. The envelope detected signals 20 are video amplified with baseline correction at video amplification module 22 to produce corresponding video bandwidth signals 24. The video bandwidth signals 24 have the same PRF and amplitude as the corresponding radar signals 12. The video bandwidth signals 24 are digitally processed at processor 26 to determine the RF band in which the corresponding RF signal occurred, to identify the PRF range of pulsed radar, and to generate control signals 28a, 28b for providing real time audible and visual alarms.

According to the preferred embodiment, the detection module 18, video amplification module 22 and processor 26 are contained within a receiver processor 30. One or more remote units 32, 34 are responsive to the receiver processor 30 for receiving the control signals 28a, 28b and for providing audible and visual indications of the detected radar signals in each of the RF bands and PRF ranges. The RF signal warning system 10 can also include an RF test unit 36 responsive to the receiver processor 30 for RF Built in Testing purposes.

Figure 2A:
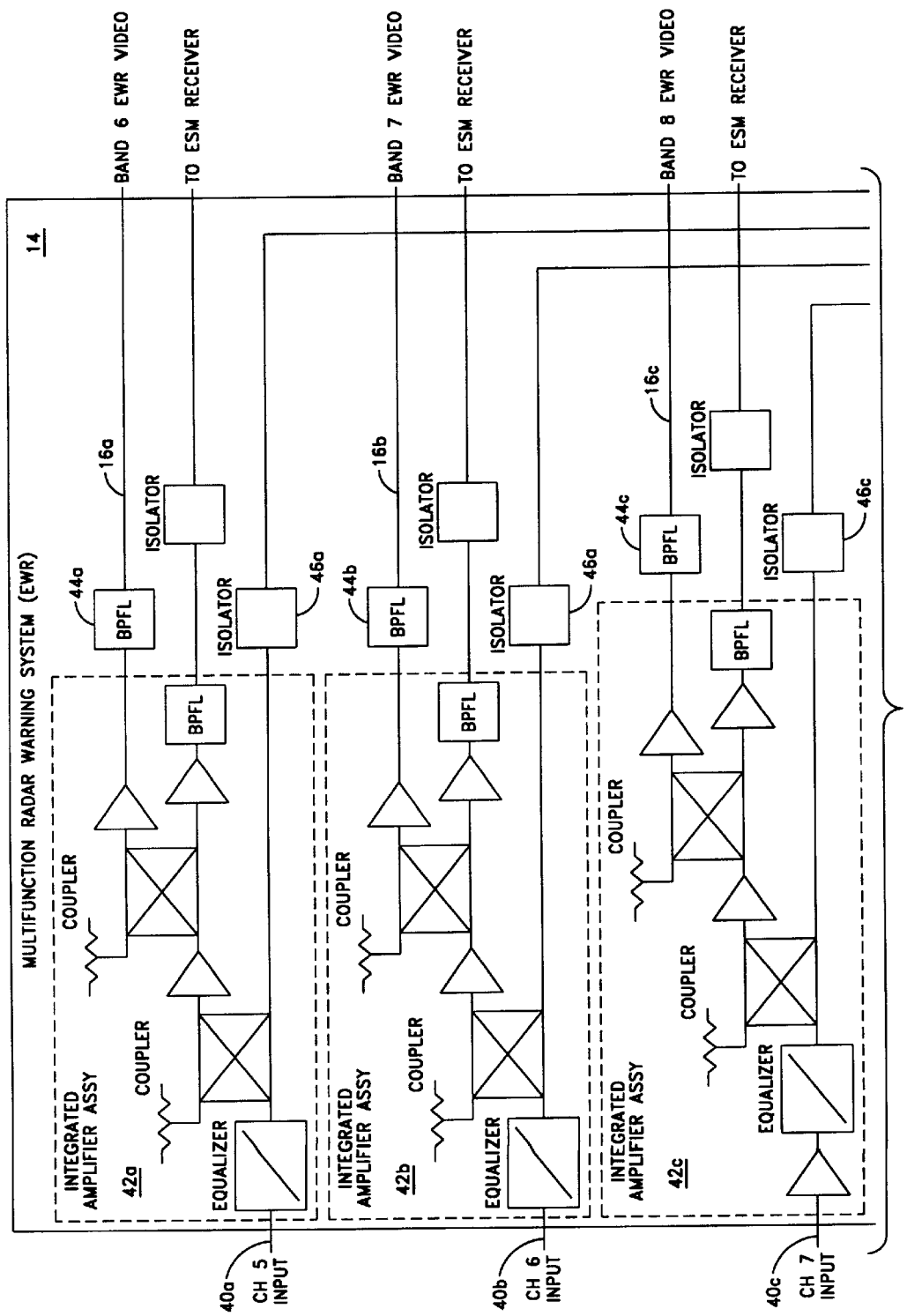
FIGS. 2A–2C are a schematic block diagram of an amplifier module of the multi-function radar warning system, according to one embodiment of the present invention.
Figure 2B:
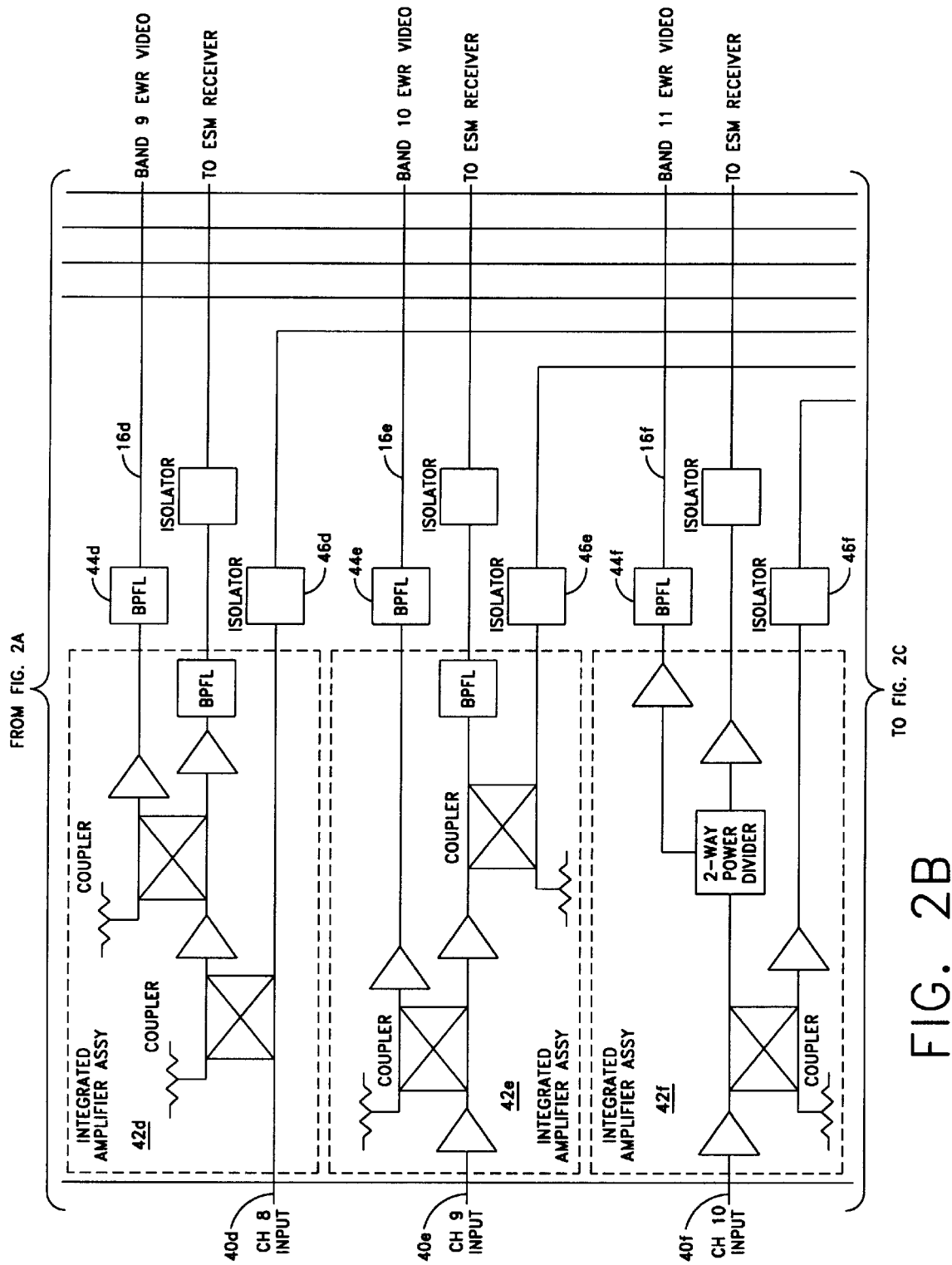
Figure 2C:
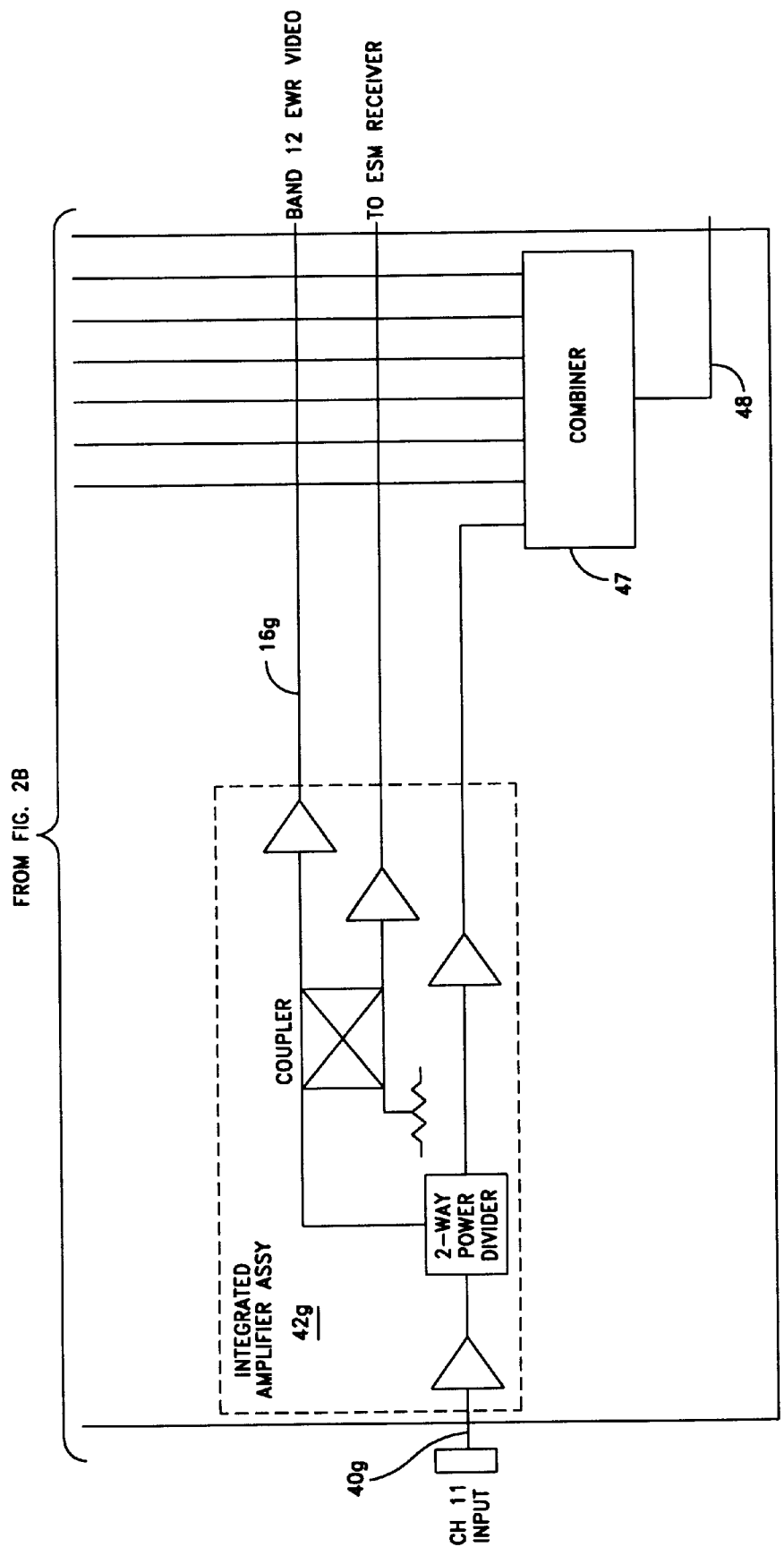
Figure 3A:
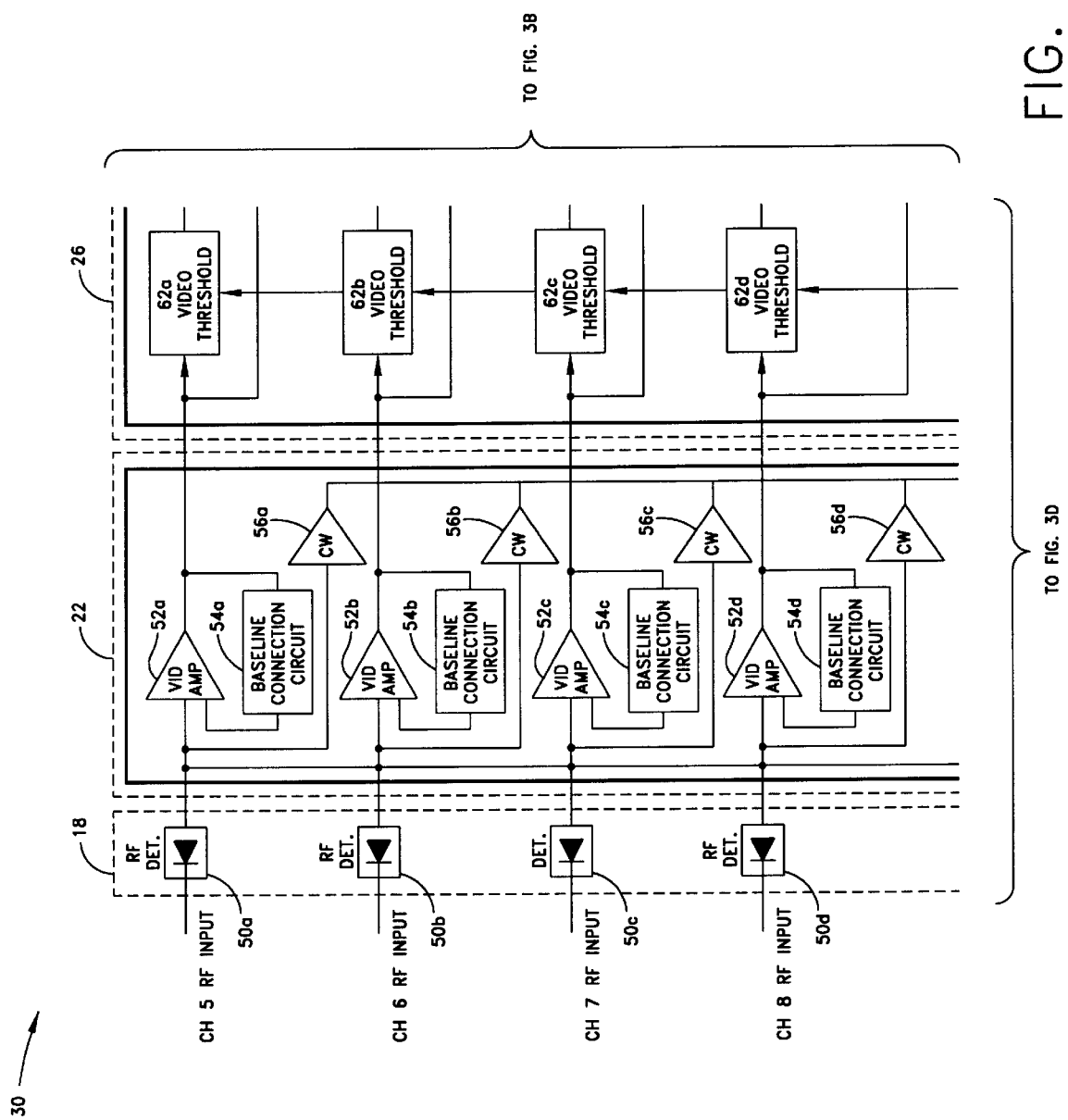
FIGS. 3A–3H and 3J are a schematic block diagram of the receiver processor used in the multi-function radar warning system, according to one embodiment of the present invention.
Figure 3B:
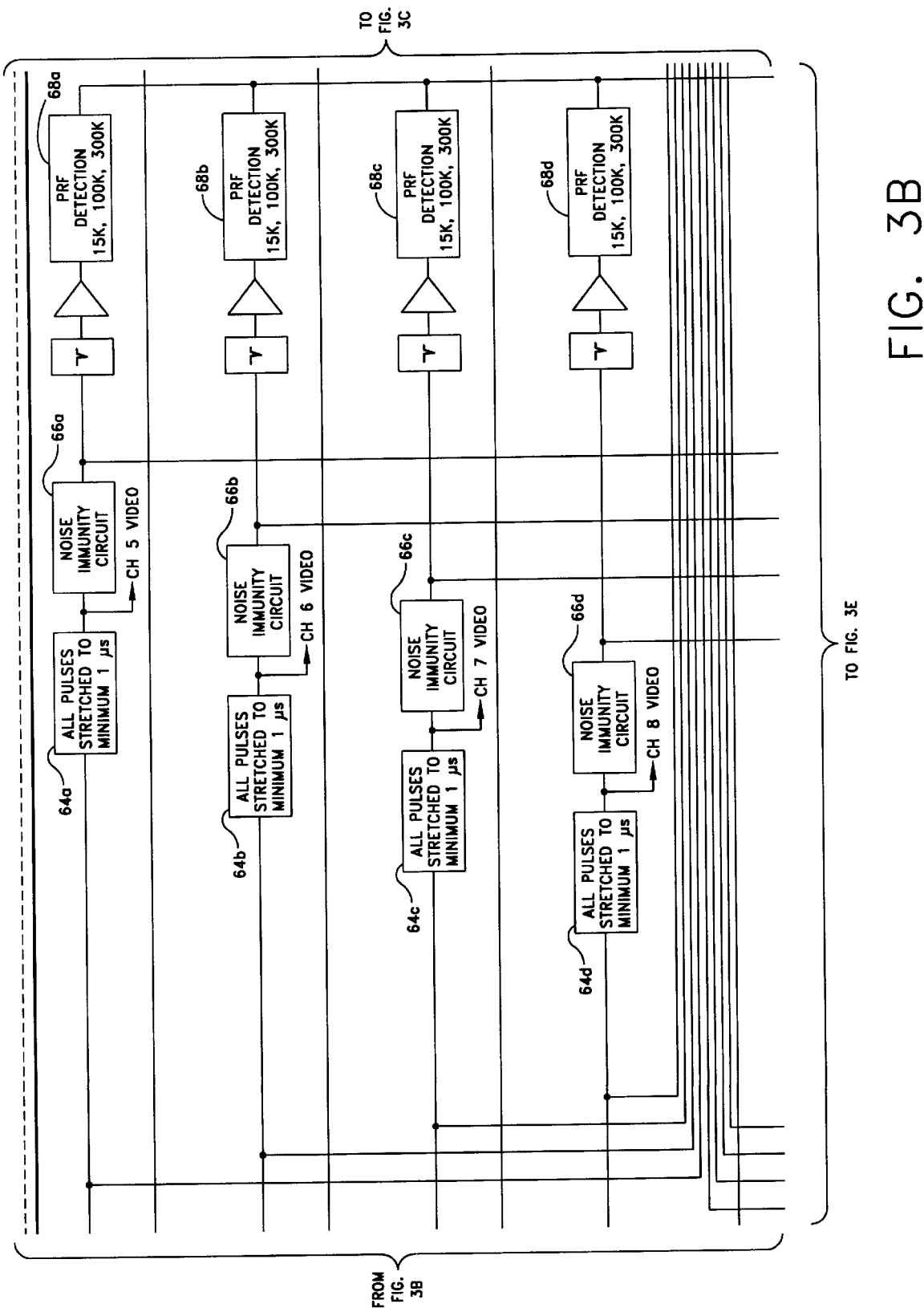
Figure 3C:
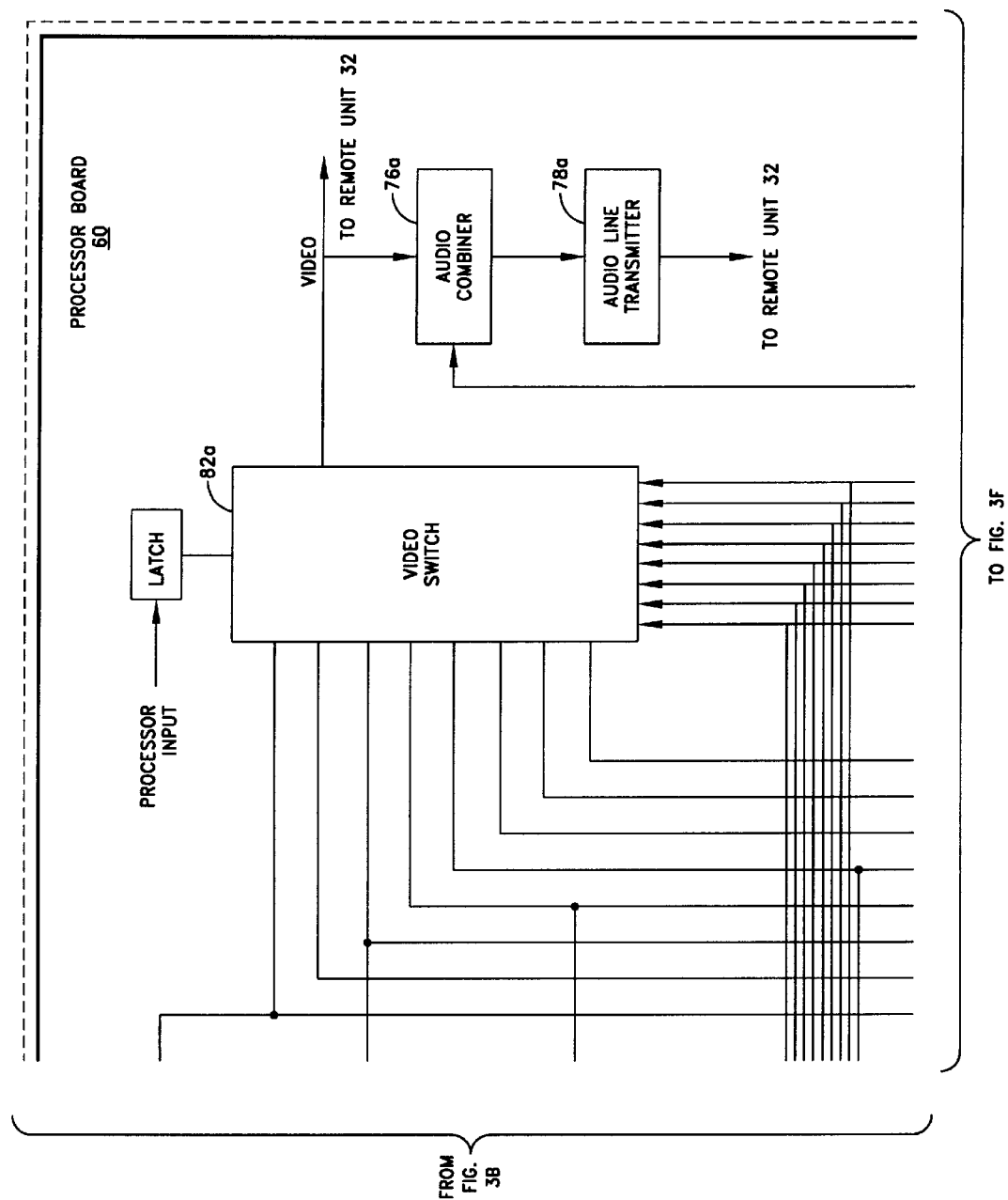
Figure 3D:
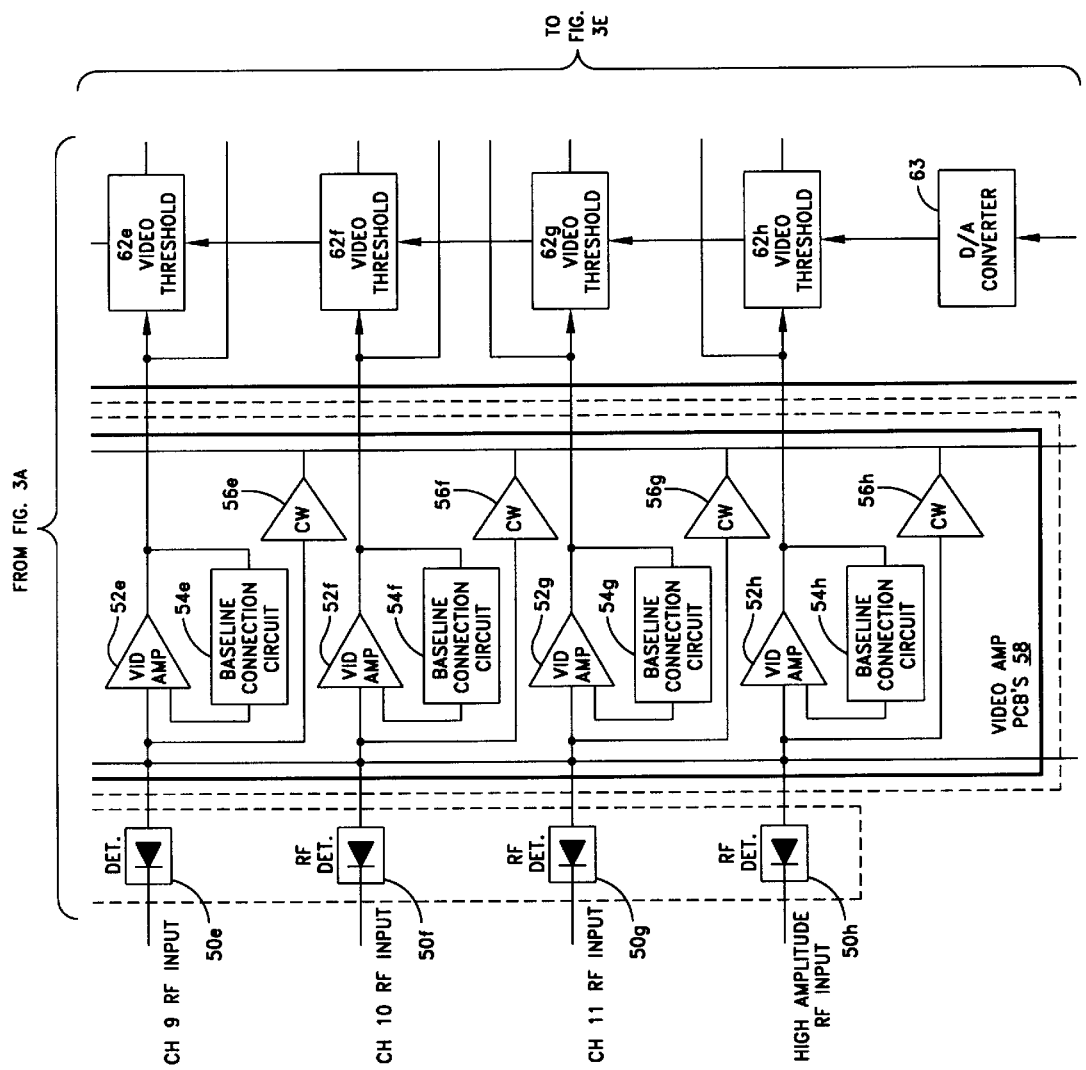
Figure 3E:
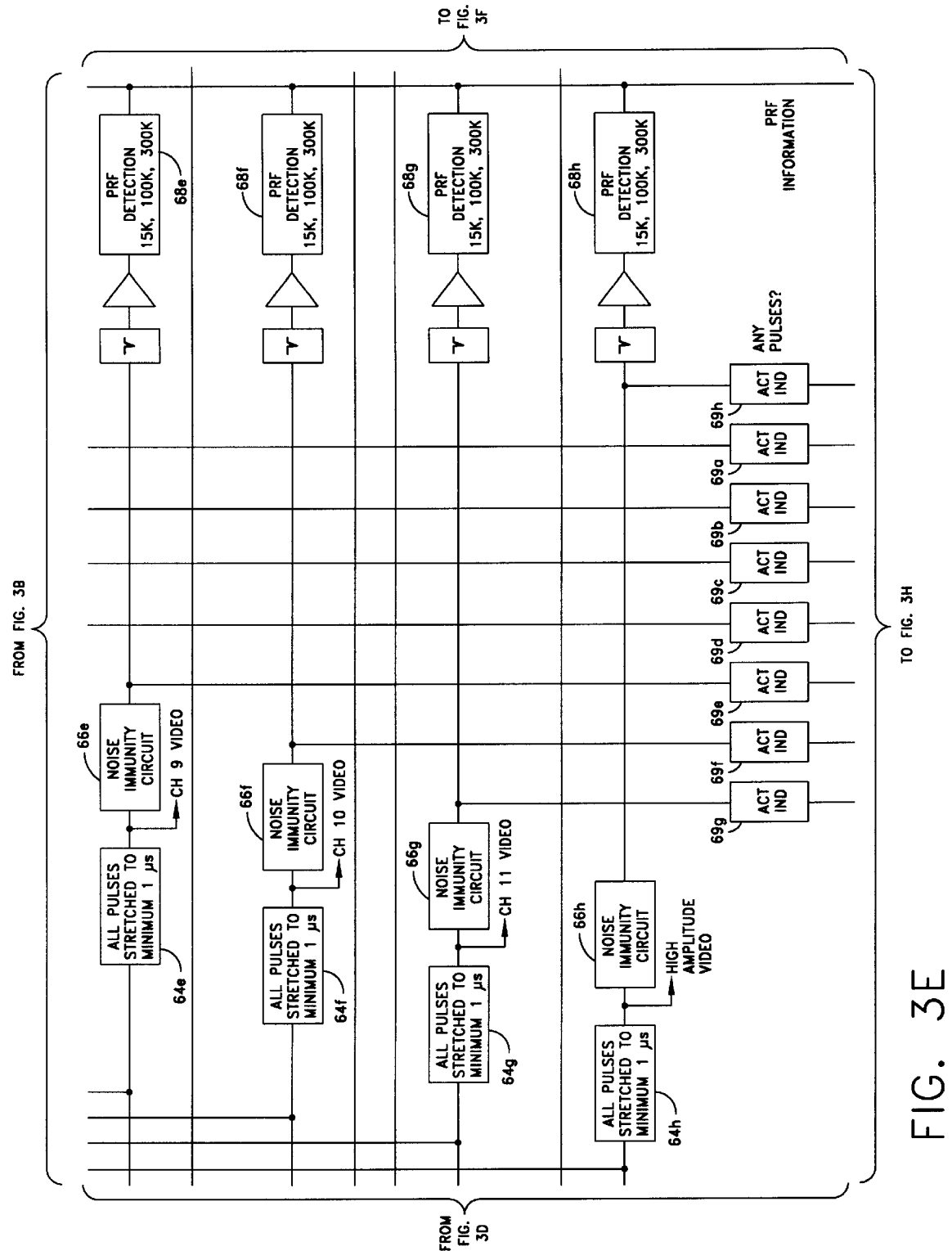
Figure 3F:
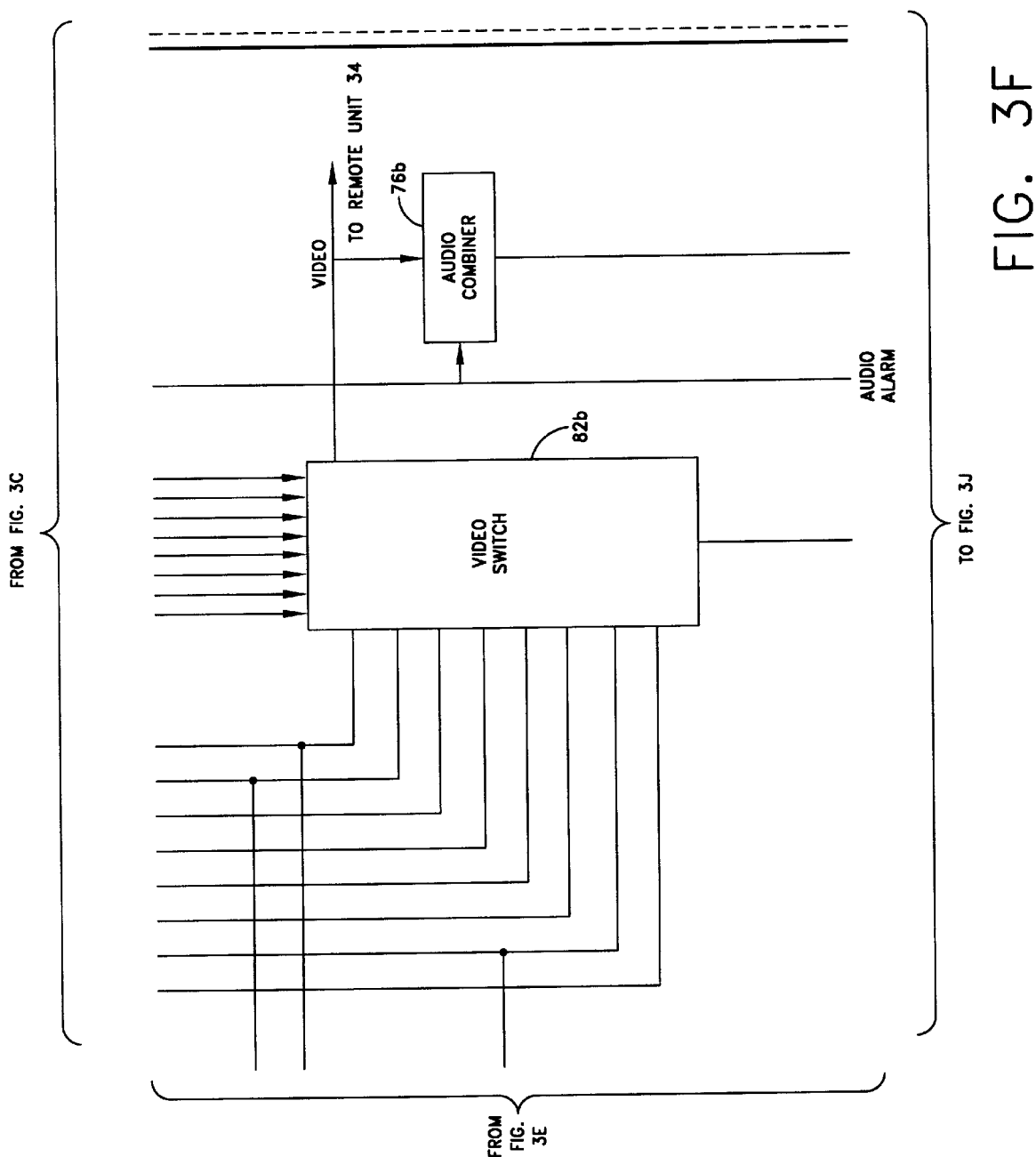
Figure 3G:
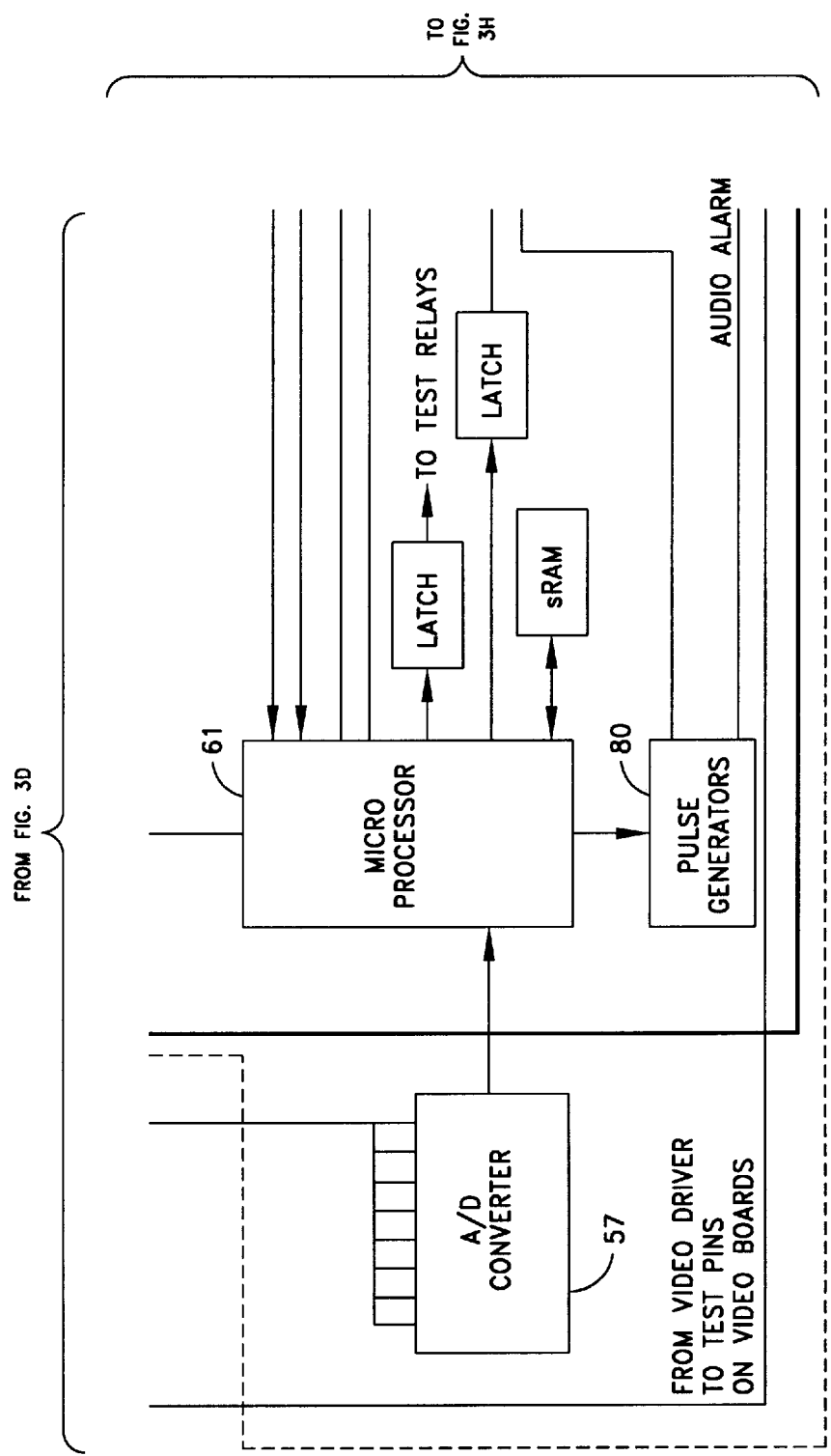
Figure 3H:
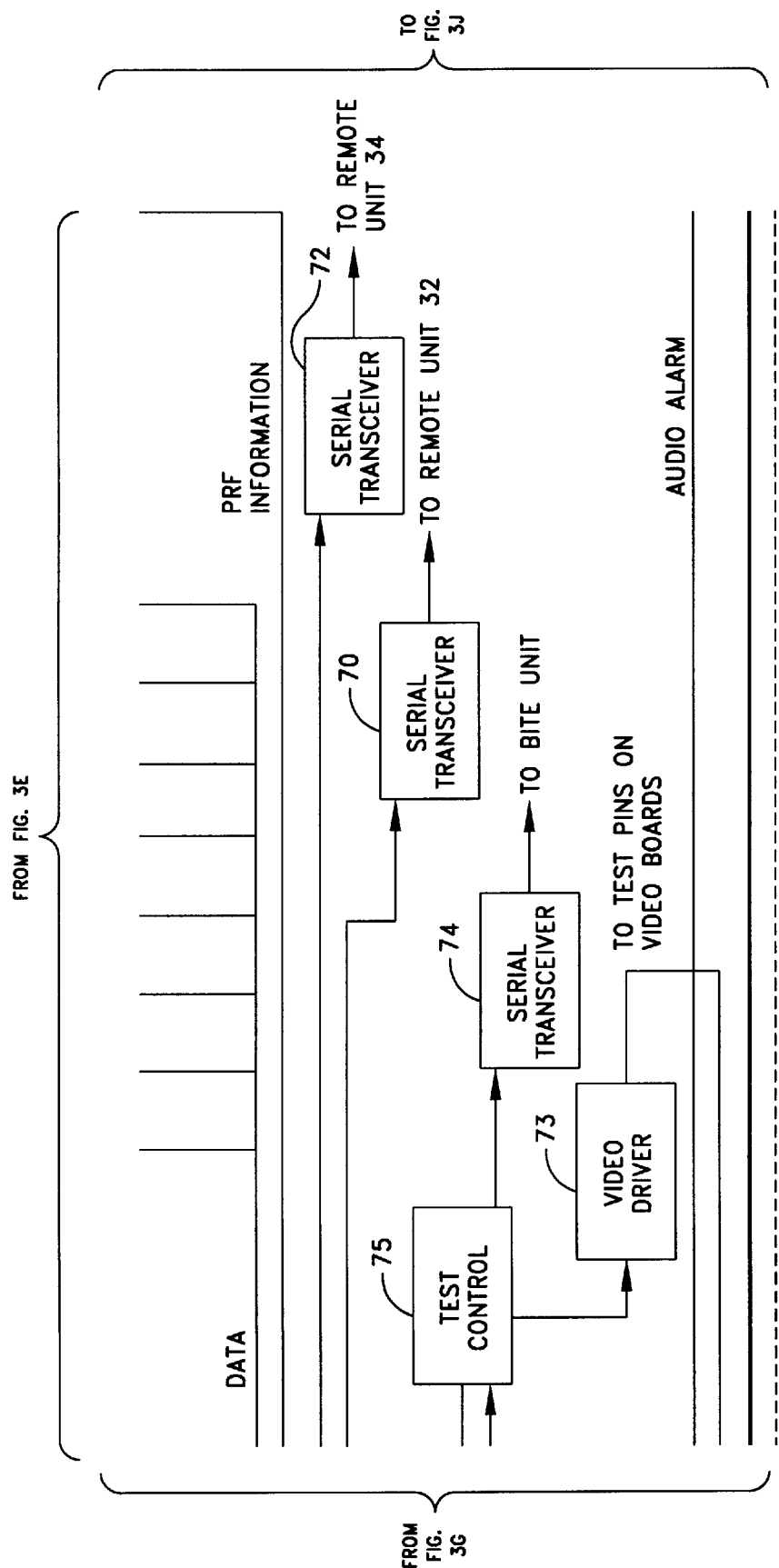
Figure 3J:
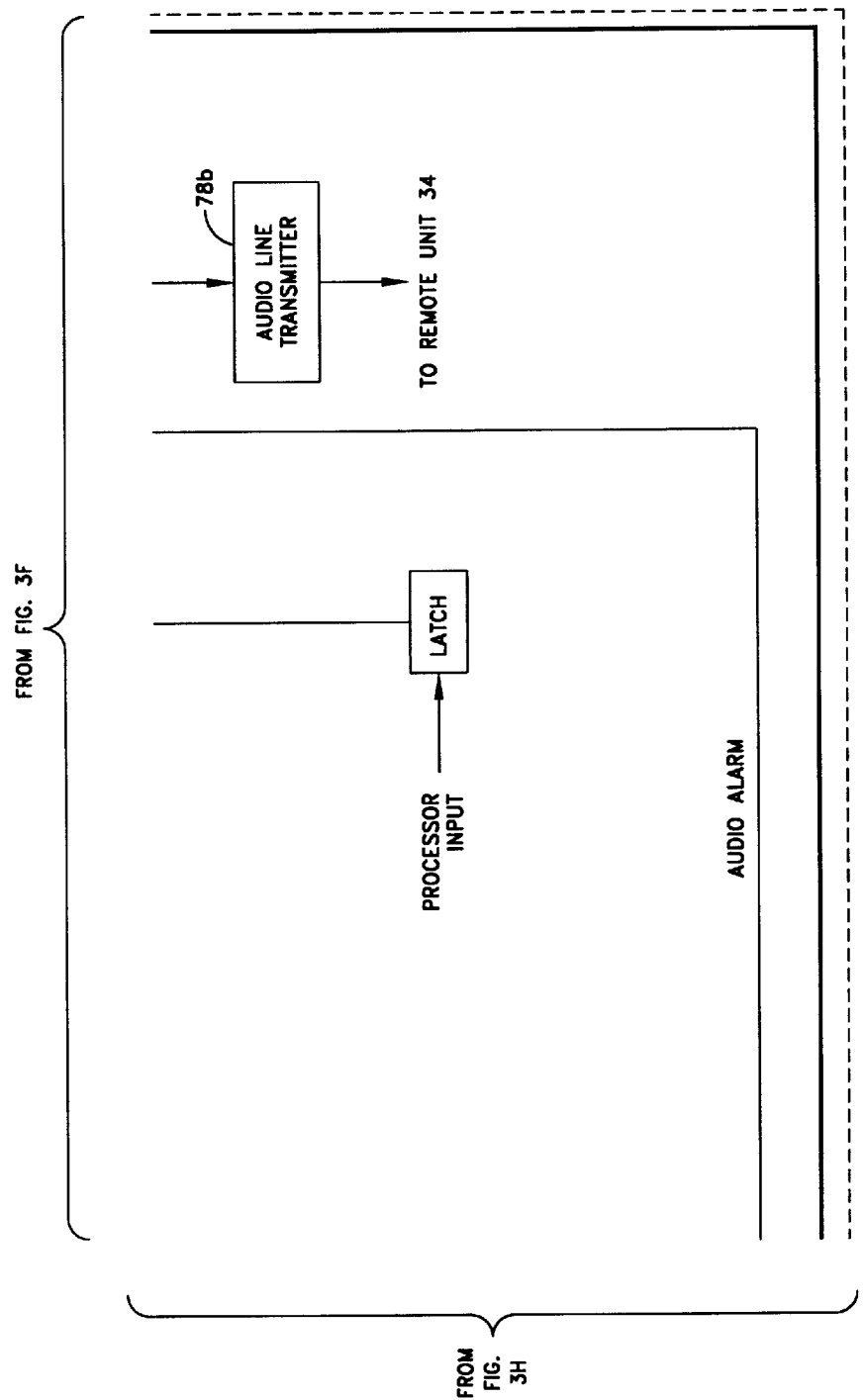

According to the exemplary embodiment, the amplifier module 14, FIGS. 2A–2C, includes a plurality of channel inputs 40a–40g for receiving the RF signals over each of the different RF bands. Although the exemplary embodiment shows seven channels, the present invention contemplates more or less signal channels for more or less RF bands. Each of the channel inputs 40a–40g is connected to an integrated amplifier assembly 42a–42g. The integrated amplifier assemblies 42a–42g can include a combination of couplers, equalizers, amplifiers, band pass filters, and 2-way power dividers depending upon the RF band being received on that channel. A band pass filter 44a–44f is coupled to one of the outputs from the integrated amplifier assemblies 42a–42f to produce the amplified and conditioned RF signals 16a–16f. An isolator 46a–46f is coupled to another output of the integrated amplifier assemblies 42a–42f, and a combiner 47 coupled to the isolators 46a–46f and amplifier assembly 42g combines the RF signals from the integrated amplifier assemblies 42a–42g to produce a high amplitude RF signal 48. Amplifier assembly 42g also produces signal 16g. Another output from the integrated amplifier assemblies 42a–42g can be coupled to an external Electronic Systems Measurement (ESM) receiver 38.

The preferred embodiment of the receiver processor 30, FIGS. 3A–3H and 3J, includes RF detectors 50a–50h, collectively detector module 18, corresponding to the RF signals in each of the RF bands and to the high amplitude RF signal, for envelope detecting the amplified and conditioned RF signals 16a–16g and the high amplitude RF signal 48. Video amplifiers 52a–52h are coupled to the RF detectors 50a–50h for video amplifying the envelope detected pulsed RF signals to produce the video bandwidth signals having the same PRF and amplitude as the radar or RF signals. Baseline correction circuits 54a–54h coupled to the video amplifiers 52a–52h provide baseline correction of the video bandwidth signals to allow processing of pulsed RF signals having a high duty cycle. Baseline correction eliminates DC drift due to thermal changes in the video amplifiers 52a–52h which may cause false tripping of the threshold circuit. In the preferred embodiment, continuous wave amplifiers 56a–56h are also coupled to the respective RF detectors 50a–50h for amplifying detected continuous wave (CW) RF signals. CW RF signals are non-pulsed signals that are detected and amplified by low offset, low bandwidth amplifiers 56a–56h. The amplified continuous wave RF signals are passed to an analog to digital converter 57. In the exemplary embodiment, the video amplifiers 52a–52h, baseline correction circuits 54a–54h, and continuous wave amplifiers 56a–56h, collectively video amplification module 22, are provided on one or more video amplifier printed circuit boards 58.

The receiver processor 30 further includes a processor board 60 having a microprocessor 61. The processor board 60 includes video threshold circuits 62a–62h that compare the amplitude of the video signals to a predetermined threshold amplitude and reject pulses in the video signal that do not exceed the predetermined threshold amplitude. Thus, pulses typically caused by random noise are prevented from being detected and causing false alarms. A digital to analog converter 63 coupled to the microprocessor 61 and to the video threshold circuits 62a–62h is used to set the threshold amplitude in response to a user input, or automatically by way of a calibration routine.

A pulse stretching circuit 64a–64h is coupled to each of the video threshold circuits for stretching pulses in the video signal. A noise immunity circuit 66a–66h is coupled to the pulse stretching circuit 64a–64h to further eliminate defects caused by noise. These circuits stretch and filter narrow noise pulses so that small video signals near the threshold level do not appear to be a multitude of pulses.

The receiver processor 30 further includes PRF detectors 68a–68h that receive the stretched video bandwidth signals and detect the PRF range of the video bandwidth signals. The PRF detectors 68a–68h transmit the PRF information to the microprocessor 61. In the exemplary embodiment, the PRF detectors 68a–68h detect whether the PRF is in a range greater than 15 kHz, greater than 100 kHz, or greater than 300 kHz. Activity detectors 69a–69h are also coupled to respective noise immunity circuits 66a–66h to detect whether any pulses are present in the video bandwidth signal even if the PRF is less than 15 kHz. The microprocessor 61 processes the activity data provided by the activity detectors 69a–69h, the PRF information provided by the PRF detectors 68a–68h, and the digitized continuous wave signal provided by the A/D converter 57. The microprocessor 61 processes this information and transmits audio and visual control signals to the remote units 32, 34 for providing visual indications of the RF bands and other characteristics of the detected signals, such as the PRF range or continuous wave, as will be described in greater detail below.

First and second serial transceivers 70, 72 coupled to the microprocessor are used to transmit visual control signals to the respective remote units 32, 34. The microprocessor 61 also receives control signals from one or both remote units 32, 34 by way of serial transceivers 70, 72, allowing the user to control the RF signal warning system 10 from the remote units 32, 34. A third serial transceiver 74 can be used to transmit test control signals from a test controller 75 to RF test unit 36 (see FIG. 1) for testing the RF signal warning system 10 by injecting CW and pulsed RF signals. The test controller 75 can also be used to test the video boards 58 by way of video driver 73 by injecting low level DC and video signals after the detection module 18. The injected signals would range from CW to audio PRF to PRF above 15 kHz, 100 kHz and 300 kHz.

One or more audio combiners 76a, 76b and audio line transmitters 78a, 78b are used to transmit the audio signals to the remote units 32, 34. For signals having a PRF above the range audible to human hearing (e.g., PRF>15 kHz) and for continuous wave signals, a synthesized digital signal is used to generate the audible alarm. If the PRF of the detected RF signals is within a range audible to human hearing (e.g., PRF<15 kHz), a digital audio signal can be used or the real time analog video bandwidth signal can used to generate an audible alarm having the same frequency as the actual PRF of the RF signal.

A pulse generator 80 coupled to the microprocessor 61 generates the synthesized audio alarm signal in response to the PRF information received by the microprocessor 61. The audio alarm for a PRF within the audio frequency range produces a sound such that the tone frequency is equal to the PRF. An operator is able to listen to the PRF and the variation in amplitude as the radar sweeps by, thus helping the operator identify the radar source. In order for the operator to listen to the variation in amplitude, the remote unit 32, 34 must be in analog mode and the video switches 82a, 82b will switch to the real video signal levels coming out of video amps 52a–52h. If the signals levels are very low, the remote unit 32, 34 may be switched to digital audio mode where the digital outputs of video threshold circuits 62a–62h are fed through the video switches 82a, 82b. In the digital mode, the audio is more sensitive but it lacks the amplitude variation due to radar scan.

Figure 4:
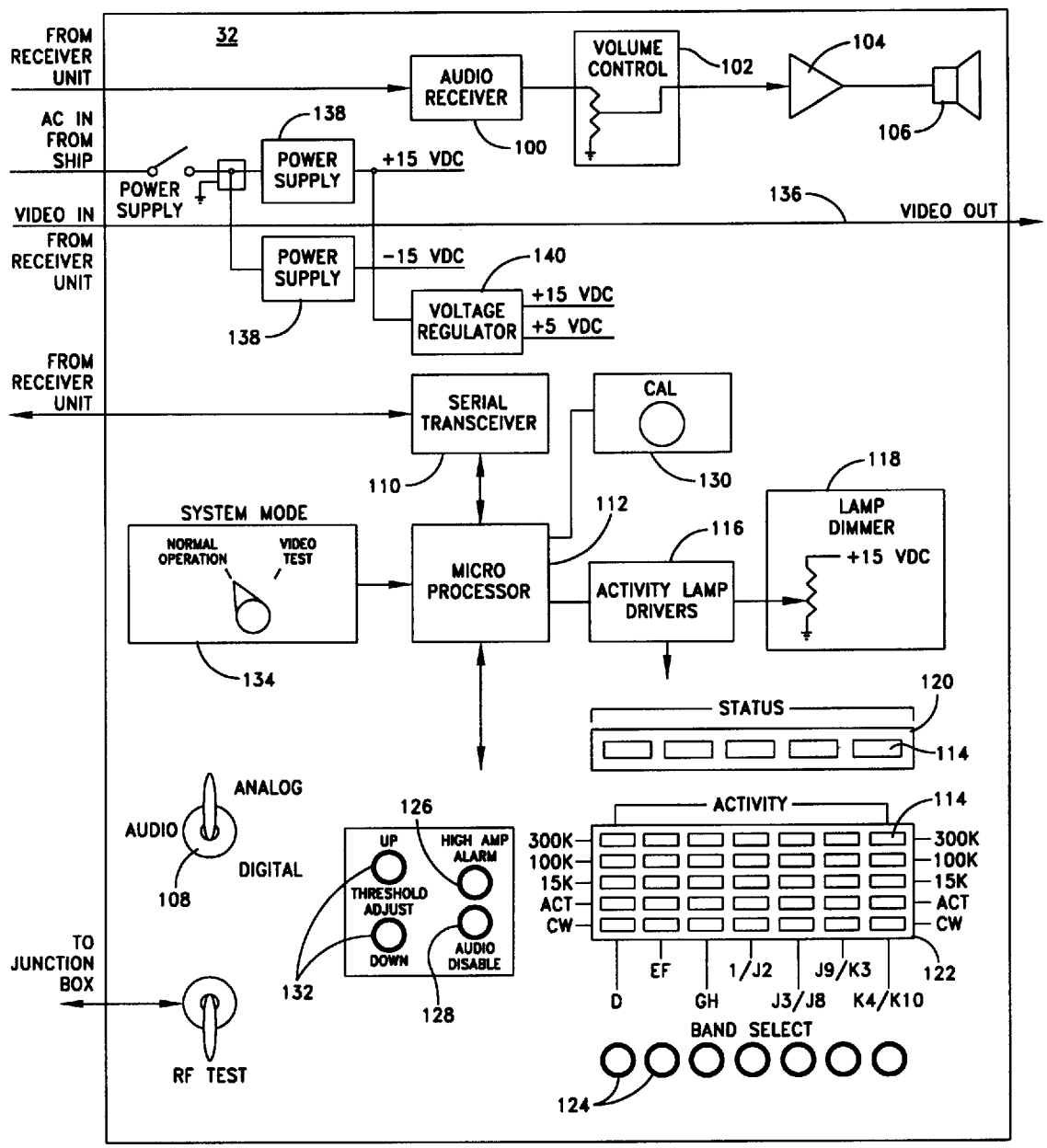
FIG. 4 is a schematic block diagram of a remote unit used in the multi-function radar warning system, according to one embodiment of the present invention.

According to the exemplary embodiment, one type of remote unit 32, FIG. 4, is used to control the multi-function RF signal warning system as well as to provide an indication of the RF signals that are detected. This remote unit 32 includes an audio receiver 100 for receiving the audio control signals transmitted by the audio line transmitter 78a on the receiver processor 30. A volume control 102 controls the volume of the audible alarm, an audio amplifier 104 amplifies the audio control signal, and a speaker 106 provides the audible alarm. An analog/digital audio switch 108 can be used to select digital or analog audio signals for signals having a PRF less than 15 kHz.

The remote unit 32 further includes a serial transceiver 110 for receiving the visual control signals from the serial transceiver 70 on the receiver processor 30 and a microprocessor 112 for processing the visual control signals. The microprocessor 112 generates indicator control signals that activate one or more visual indicators 114, such as light emitting diode (LED) indicators, in response to the received visual control signals. Lamp drivers 116 receive indicator control signals generated by the microprocessor 112 and cause the indicators 114 to be illuminated in response to the control signals, thereby providing an indication of the characteristics of the detected RF signals. A lamp dimmer 118 can be used to control the brightness of the LED indicators. Additionally, control signals from the various switches on remote unit 32 are processed by microprocessor 112 and transmitted back to transceiver 70 via transceiver 110.

In the exemplary embodiment, the remote unit 32 includes a set of status indicators 120 that are illuminated to provide an indication of the status of the multi-function radar warning system 10. For example, the status indicators can include a limited coverage indicator for indicating that the audible alarm is not enabled in one or more RF bands, a test indicator for indicating a test or calibration is taking place, a power indicator for indicating power is applied to the system, an AC mated indicator for indicating an autocoupler is engaged, and a periscope raised indicator for indicating that a periscope is fully raised.

The exemplary embodiment of the remote unit 32 also includes a set of activity indicators 122 that indicate the band of the RF or radar signals detected by the system and the PRF range of the radar signal. For each RF band, an activity indicator indicates that a pulsed signal is detected, a 15 K indicator indicates when a pulsed signal is detected that exceeds the 15 kHz PRF threshold setting, a 100 K indicator indicates that a pulsed signal exceeds the 100 kHz PRF threshold setting and a 300 K indicator indicates that a pulsed signal exceeds the 300 kHz PRF threshold setting. A CW indicator indicates that a continuous wave or high duty cycle pulsed RF signal is detected.

The remote unit 32 can also include one or more band select switches 124 corresponding to each of the RF bands, for enabling and disabling the audio alarms in each of the RF bands. When one of the bands is deselected using one of the band select switches 124, the limited coverage indicator in the set of status indicators 120 is illuminated. Also, a control signal is sent to microprocessor 61 of processor 30 via serial transceiver 110. In response to the control signal, microprocessor 61 disables the appropriate band's audio and video.

The remote unit 32 can also include a high amplitude alarm indicator 126 that provides an indication of a high amplitude emitter being detected. A high amplitude audio disable switch 128 can be used to disable the high amplitude alarm audio. The high amplitude alarm is used to detect high level RF signals which may indicate very close proximity to a radar. Such an alarm can be used as a collision avoidance alarm.

The remote unit 32 also includes a calibration switch 130 that activates a calibration mode in the multi-function radar warning system 10. The calibration can be performed automatically or manually. For manual calibration, threshold adjustment switches 132 are used to increase or decrease the threshold amplitude setting of the band currently in manual calibration. The threshold adjustment switches are used for continuous wave, high PRF and high amplitude threshold settings in test/maintenance modes.

The exemplary embodiment of remote unit 32 further includes a system mode switch 134 that allows the user to select a mode of operation. For example, the user can select a normal operation of the multi-function radar warning system 10, or a video test mode in which the system initiates a continuous video test. The present invention contemplates other additional modes used for testing/maintenance purposes. The remote unit 32 provides a video output 136 for testing purposes. The remote unit 32 further includes one or more power supplies 138 and a voltage regulator 140 for supplying power to the remote unit 32 as well as the receiver processor 30.

Figure 5:
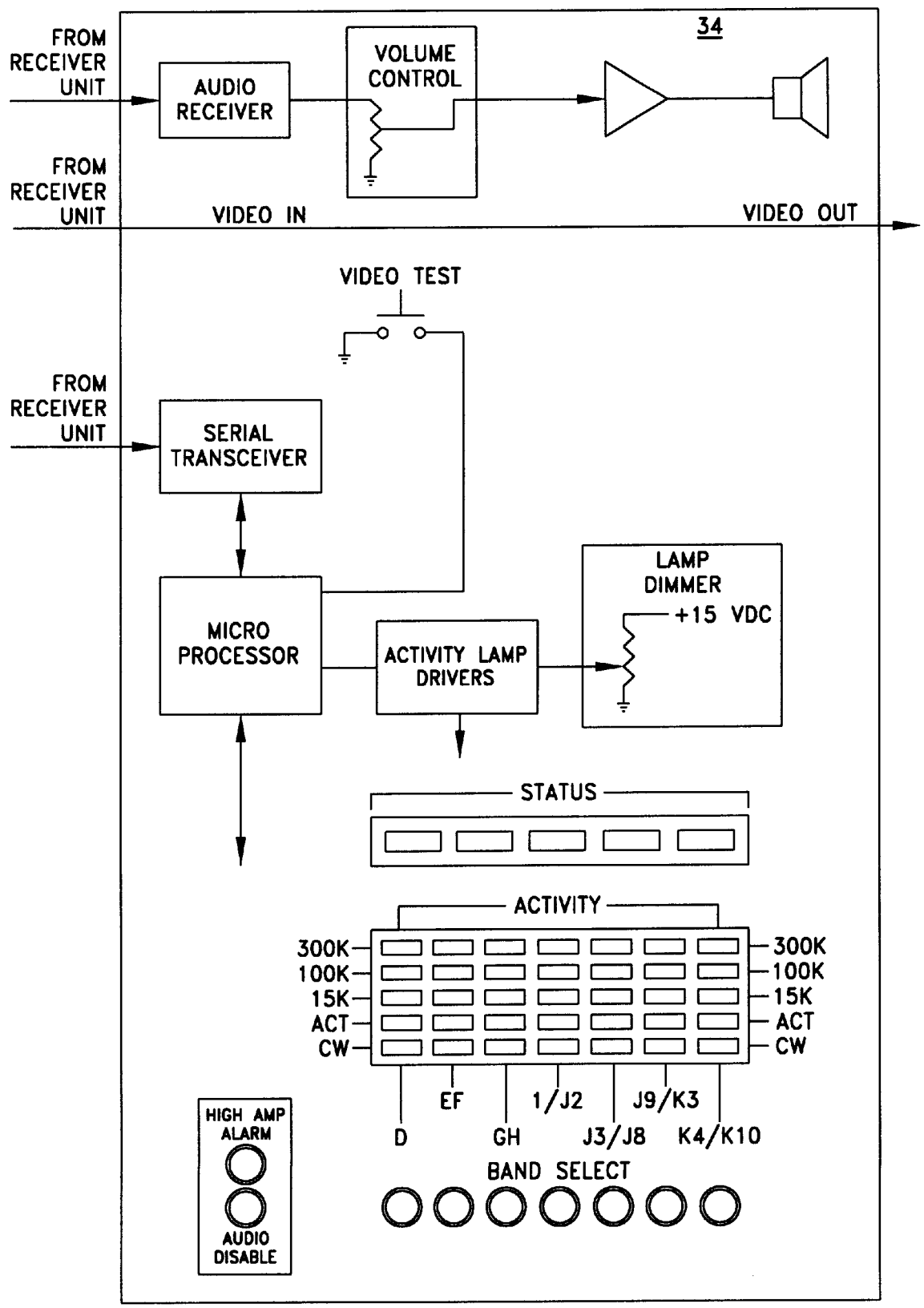
FIG. 5 is a schematic block diagram of a remote unit used in the multi-function radar warning system, according to another embodiment of the present invention.

Another type of remote unit 34, FIG. 5, according to the exemplary embodiment, provides the audible and visual indication of the radar signals but does not allow remote control of the testing and calibration of the multi-function RF signal warning system 10.

Accordingly, the multi-function RF signal warning system 10 of the present invention is capable of receiving various types of radar signals based on current and projected future radar systems. The multi-function RF signal warning system 10 is also capable of providing audible alarms and visual indications of the radar signals at remote locations as well as providing control of the multi-function RF signal warning system from the remote location.

In light of the above, it is therefore understood that within the scope of the appended claims, the invention may be practiced otherwise than as specifically described.

What is claimed is:

1. A radio frequency (RF) signal warning system for detecting and providing an indication of RF signals in at least one RF band, wherein said RF signals include at least one pulsed RF signal having a pulse repetition frequency (PRF), said system comprising:

amplifying and conditioning means for amplifying and conditioning said RF signals to produce corresponding amplified and conditioned RF signals;

RF detection means for envelope detecting said corresponding amplified and conditioned RF signals to produce corresponding envelope detected RF signals;

video amplifying means for video amplifying said corresponding envelope detected RF signals to produce corresponding video bandwidth signals, wherein said corresponding video bandwidth signals corresponding to said at least one pulsed RF signal have the same PRF as said at least one pulsed RF signal;

processing means for processing said video bandwidth signals to determine an RF band of said at least one RF signal and a PRF range of said at least one pulsed RF signal, wherein said processing means generates and transmits audio and visual control signals for indicating said RF band and said PRF range; and at least one remote unit, responsive to said audio and visual control signals, for providing audible alarms and for providing visual indication of said RF band and said PRF range.

2. The system of claim 1 wherein said processing means includes:

at least one PRF detector, for detecting said PRF range of said at least one pulsed RF signal; and a microprocessor, coupled to said at least one PRF detector, for receiving PRF information and for generating said audio and visual control signals based upon said PRF information.

3. The system of claim 2 wherein said processing means further includes at least one serial transceiver, coupled to said microprocessor, for transmitting said visual control signals to said at least one remote unit.

4. The system of claim 1 wherein said RF signals include at least one continuous wave RF signal, and further including:

at least one continuous wave signal amplifier, coupled to said RF detection means, for amplifying said continuous wave RF signal; and an analog-to-digital converter, coupled to said at least one continuous wave signal amplifier, for digitizing said at least one continuous wave RF signal to be processed.

5. The system of claim 1 further including baseline correction means, coupled to said video amplifying means, for baseline correcting said RF signal being video amplified.

6. The system of claim 1 wherein said processing means further includes at least one video threshold circuit, coupled to said at least one video amplifying means, for comparing said video bandwidth signals to a predetermined threshold amplitude and for rejecting pulses in said video bandwidth signals having an amplitude lower than said predetermined threshold amplitude.

7. The system of claim 1 further including a combiner coupled to said amplifying and condition means, for combining each of said amplified and conditioned RF signals, to produce a high amplitude signal, wherein said RF detection means envelope detects said high amplitude signal to produce an envelope detected high amplitude signal, said video amplifying means video amplifies said envelope detected high amplitude signal to produce a video high amplitude signal, and said processor processes said video high amplitude signal to determine if said video high amplitude signal is above a predetermined high amplitude threshold setting, said remote unit providing a high amplitude audible alarm and visual indication of said high amplitude signal when said video high amplitude signal is above said predetermined high amplitude threshold setting.

8. The system of claim 1 wherein said at least one remote unit includes a plurality of activity indicators corresponding to each of said RF bands for indicating said PRF range of said at least one pulsed RF signal detected by said RF detecting means.

9. The system of claim 8 wherein said at least one remote unit includes a plurality of band select switches for enabling and disabling audio alarms in selected ones of said RF bands.

10. A receiver processor for use in a radio frequency (RF) signal warning system, said receiver processor including:
   a plurality of channel inputs for receiving RF signals in a plurality of RF bands, wherein at least one of said RF signals is a pulsed RF signal having a pulse repetition frequency (PRF);
   a plurality of RF detectors for envelope detecting said RF signals to produce corresponding envelope detected RF signals;
   a plurality of video amplifiers and baseline correction circuits coupled to respective said RF detectors for video amplifying and baseline correcting said corresponding envelope detected RF signals to produce corresponding video bandwidth signals, wherein said corresponding video bandwidth signal corresponding to said at least one pulsed RF signal has the same PRF as said at least one pulsed RF signal; and
   a processor coupled to each of said video amplifiers and baseline correction circuits for processing said corresponding video bandwidth signals to determine said RF band of said RF signals and a PRF range of said at least one pulsed RF signal, and for generating and transmitting audio and visual control signals.

11. The receiver processor of claim 10 wherein said processor includes:
   a plurality of PRF detectors, for receiving said video bandwidth signals and detecting said PRF range of said at least one pulsed RF signal; and
   a microprocessor, coupled to said plurality of PRF detectors, for receiving PRF information from said plurality of PRF detectors and for generating said audio and visual control signals based upon said PRF information.

12. The receiver processor of claim 11 wherein said processor further includes at least one serial transceiver, coupled to said microprocessor, for transmitting said control signals to at least one remote unit.

13. The receiver processor of claim 11 wherein said RF signals include at least one continuous wave RF signal, and further including:
   a plurality of continuous wave signal amplifiers, coupled to respective said RF detectors, for amplifying said at least one continuous wave RF signal; and
   an analog-to-digital converter, coupled to said continuous wave signal amplifiers and to said microprocessor, for digitizing said at least one continuous wave RF signal to be processed by said microprocessor.

14. The receiver processor of claim 10 further including a plurality of video threshold circuits, coupled to respective said video amplifiers and baseline correction circuits, for comparing said video bandwidth signals to a predetermined threshold amplitude and for rejecting pulses in said video bandwidth signals having an amplitude lower than said predetermined threshold amplitude.

15. The receiver processor of claim 14 further including a plurality of pulse stretching circuits, coupled to respective said video threshold circuits, for stretching pulses in said video bandwidth signal.

16. A remote unit for use in a radio frequency (RF) signal warning system that receives and detects RF signals in RF bands, said remote unit comprising:
   an audio control signal receiver for receiving audio control signals generated and transmitted by said radio frequency (RF) signal warning system when an RF signal is detected;
   a speaker responsive to said audio control signal receiver for generating an audible alarm corresponding to said RF signal detected by said radio frequency (RF) signal warning system;
   a serial transceiver for receiving visual control signals from said radio frequency (RF) signal warning system;
   a microprocessor responsive to said visual control signals for processing said visual control signals to determine characteristics of said RF signals detected by said system and for generating indicator control signals; and
   a plurality of RF signal indicators responsive to said indicator control signals for providing a visual indication of said characteristics of said RF signal.

17. The remote unit of claim 16 wherein said plurality of RF signal indicators include a set of activity indicators responsive to said indicator control signals for indicating RF signal activity in at least one RF band, wherein said RF signal activity includes an indication of a pulse repetition frequency range of at least one pulsed RF signal in said at least one band.

18. The remote unit of claim 17 wherein said RF signal activity includes an indication of a continuous wave RF signal in said at least one band.

19. The remote unit of claim 17 further including a plurality of band selection switches for enabling and disabling audible alarms in selected ones of said RF bands.

20. The remote unit of claim 16 further including a high amplitude alarm indicator responsive to a visual control signal generated when a high amplitude signal is detected by said radio frequency (RF) signal warning system and determined to have an amplitude above a predetermined high amplitude threshold.

21. The remote unit of claim 20 further including an audio disable switch for disabling said high amplitude audible alarm.

22. The remote unit of claim 16 further including a calibration switch for activating a calibration mode of said radio frequency (RF) signal warning system.

23. The remote unit of claim 22 further including threshold adjustment switches for adjusting a threshold amplitude setting in said RF signal warning system in said calibration mode.

24. The remote unit of claim 16 further including an audio mode switch for selecting an analog audio mode or a digital audio mode for said audio control signals received by said audio receiver.

25. The remote unit of claim 16 further including a system mode switch for selecting a normal operation mode or a video test mode.

* * * * *